United States Patent [19]

Polito

[11] Patent Number: 5,133,572
[45] Date of Patent: Jul. 28, 1992

[54] TRAILER HITCH

[76] Inventor: Felipe J. J. Polito, 1433 Superior Ave., #303, Newport Beach, Calif. 92663

[21] Appl. No.: 624,063

[22] Filed: Dec. 4, 1990

[51] Int. Cl.$^5$ .............................................. B60D 1/06
[52] U.S. Cl. .................................... 280/513; 280/511
[58] Field of Search ............... 280/513, 511, 512, 504, 280/414.1, 491.2

[56] References Cited

U.S. PATENT DOCUMENTS

| | | | |
|---|---|---|---|
| 1,636,295 | 7/1927 | Dempsey | 280/513 |
| 2,848,253 | 8/1958 | Walker | 280/513 |
| 3,374,268 | 3/1968 | Groves | 280/512 |
| 3,773,358 | 11/1973 | Butler et al. | 280/513 |
| 3,831,982 | 8/1974 | Bernhardt et al. | 280/511 |
| 4,225,261 | 9/1980 | Marx | 280/513 X |
| 4,344,635 | 8/1982 | Welton | 280/414.1 |

FOREIGN PATENT DOCUMENTS

| | | | |
|---|---|---|---|
| 897208 | 7/1949 | Fed. Rep. of Germany | 280/513 |
| 2476554 | 8/1981 | France | 280/491.2 |

Primary Examiner—Kenneth R. Rice
Assistant Examiner—Kevin Hurley
Attorney, Agent, or Firm—Grant L. Hubbard

[57] ABSTRACT

A ball joint type trailer hitch which comprises a ball assembly and a ball receiving assembly comprising a body forming a ball receiving end having formed therein a generally spherical cavity truncated at the bottom thereby forming a passage for the shaft when the ball is in the cavity, a ball insertion and removal opening intersecting the cavity thereby forming a passage between the opening and the cavity for permitting the ball to be inserted into the opening and moved distally into the cavity, ball locking means supported in the passage for selective movement from an unlocked position adjacent the proximate end of the body to a locked position in engagement with the ball in the cavity, and means for selectively fixing the ball locking means in engagement with the ball.

1 Claim, 1 Drawing Sheet

TRAILER HITCH

FIELD OF THE INVENTION

This invention relates to vehicles generally and to trailer hitches which are used for connecting a pulling vehicle, e.g. a truck, tractor, automobile, etc., to another vehicle, e.g. a trailer, for pulling the latter. The invention has application wherever one device is used to pull another device.

BACKGROUND OF THE INVENTION

Ball-Joint type trailer hitches are well known in the art. Such hitches comprise a ball which is connected to or formed integrally to a shaft or other means for being connected to a vehicle, usually the pulled vehicle. For simplicity, the pulled vehicle will here be referred to as a trailer though it may be a boat, aircraft, etc. Such ball joint hitches are known to be highly susceptible to breakage and to accidental opening due to the forces exerted during pulling and vibration during travel. Many locking devices have been designed to overcome the risks inherent in using most of the prior art ball joint hitches.

The present invention is an improved ball-joint type trailer hitch which incorporates unique ball receiving structure and locking means.

SUMMARY OF THE INVENTION

The present invention is an improved trailer hitch which comprises a ball having a shaft secured thereto for attachment to one vehicle and ball receiving means for attachment to the other vehicle for permitting one vehicle to pull the other. In accordance with this invention, the ball receiving means comprises a body having a proximal end and a distal end, means at the proximal end for being attached to a vehicle, ball receiving means at the distal end. The body defines, proximate the distal end, a ball receiving cavity forming, when in use, a ball-joint with the ball. The ball receiving cavity is formed in the body so as to define a bottom opening for receiving the ball attachment shaft. The bottom opening is substantially larger than the ball attachment shaft and substantially smaller than the ball for permitting ball-joint motion of the ball in the cavity and preventing the ball from passing through the bottom opening. The body also has, formed in the bottom, a ball receiving opening of a size and configuration for receiving the ball therein. The ball receiving opening intersects the distal side of the cavity thereby forming a passage for the ball to move distally in the body from the ball receiving opening to the cavity. Means are provided in the body for selective reciprocal movement distally and proximally therein for engaging a side of the ball and locking the ball in the cavity.

In the preferred embodiment, the body defines a cylindrical passage extending between the proximal and distal ends of the body and the means for locking the ball in the cavity comprises a generally cylindrical plug having formed at the distal end thereof a concave generally spherical surface for engaging the surface of the ball.

The means for locking the ball in the cavity may comprise means carried by the plug for selective engaging the body in the locked position to prevent movement of the plug from the locked position. The means carried by the plug comprises a shaft and means resiliently biasing an end of the shaft toward the body and wherein the body has formed therein an opening for being engaged by the shaft. The body has formed therein a passage intersecting the opening for receiving the shaft and the shaft has an indent formed in the engaging end of the shaft. A keeper pin is selectively received in the passage and the indent in the keeper pin.

Also in the preferred embodiment, the body has formed therein an L-shaped opening into the plug receiving passage, the shaft, plug and L-shaped opening being so formed and configured as to define an over-center locking assembly.

BRIEF DESCRIPTION OF THE DRAWINGS

FIG. 3 depicts the top of the body of the hitch and portions of the locking means.

DESCRIPTION OF THE PREFERRED EMBODIMENT

Figure 1:
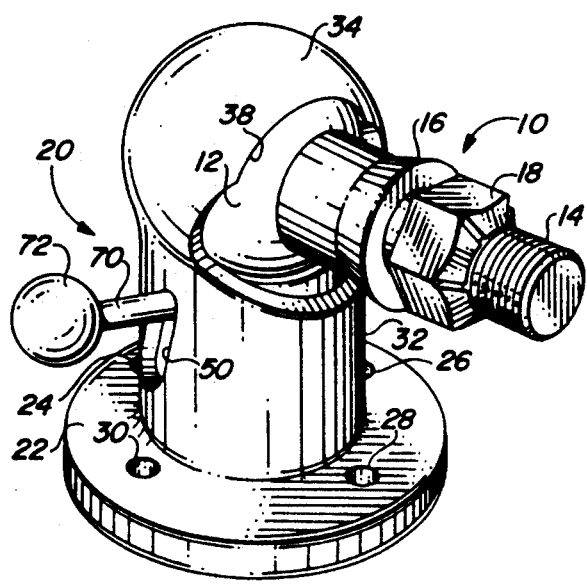
FIG. 1 depicts the distal end of the hitch, viewed toward the pulling vehicle.
Figure 4:
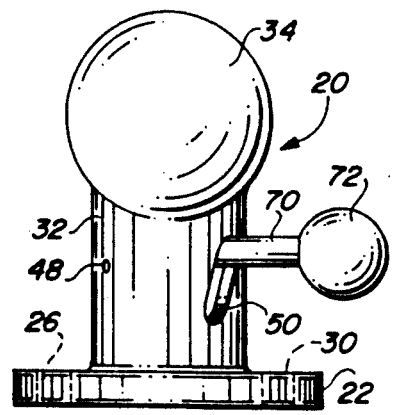
Figure 2:
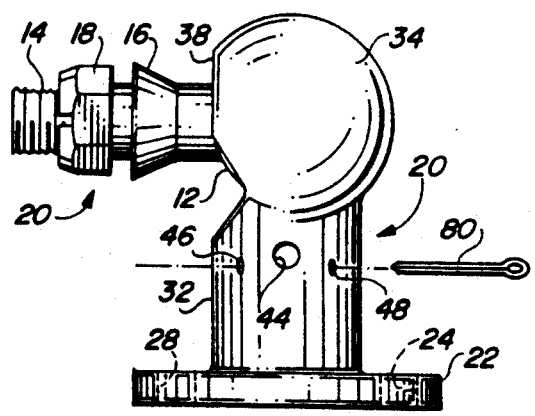
FIGS. 2 and 3, respectively, depict views of the sides of the hitch, with the proximal pulling vehicle attachment plate down, rather than in the normal use orientation as shown in FIG. 1.
Figure 5:
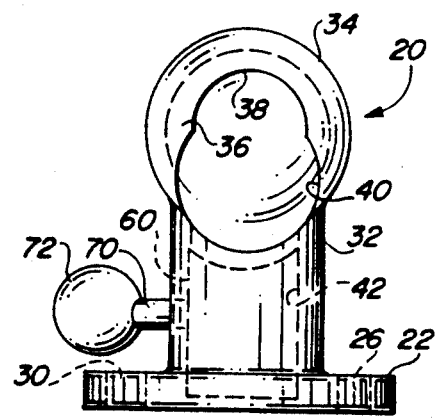
FIG. 5 depicts the bottom of the body of the hitch showing the passage into the ball receiving cavity and the ball receiving opening and portions of the locking means.
Figure 3:
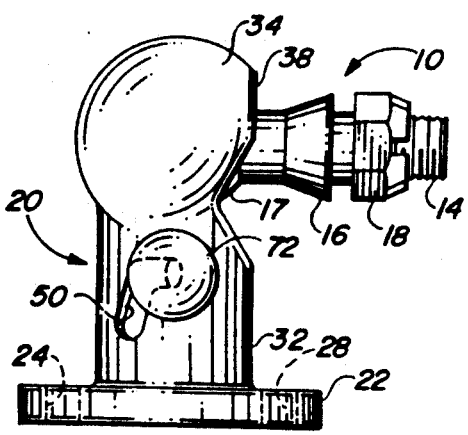

The preferred embodiment of the invention is depicted in the drawings and will be described in some detail on the premise and with the understanding that this specific embodiment is described to exemplify the best mode known to the inventor for making the invention and not as defining the outer limits of the invention or the scope of the patent. Many variations are immediately apparent, e.g. making the structures in smaller component parts and welding or securing the component parts together, the use of other keeper mechanisms, etc.

In the preferred embodiment, the hitch is comprised of a ball assembly 10 which is of generally conventional design comprising a ball 12 formed on the end of a shaft 14 which may have formed thereon or attached thereto means such as the enlarged portion 16 forming an abutment and being threaded at its distal end to receive a nut 18 for securing the ball assembly to the tongue of a trailer. Virtually any ball assembly of appropriate size is suitable for use in this invention.

The invention comprises a unique body 20 which, in use, receives the ball 12 in three dimensional ball-joint relationship, permitting pivotal movement up and down and side to side in a cavity, as will be described. The body comprises mounting means such as plate 22 having a plurality of passages 24, 26, 28 and 30 for receiving bolts to secure the body to the pulling vehicle. The mode of connection to the vehicle is of no significance in the present invention and any suitable mechanism may be used.

Extending from the mounting plate 22 a cylindrical shaft 32 supports, on the distal end thereof, ball receiving means which may be, and preferably is, a partial truncated spherical body portion 34 having and internal cavity 36 in the form of a sphere having the segment that, in use is at the bottom, removed to permit a shaft to extend from the cavity out of the body portion 34, as described below. The proximal end of the shaft 32 is secured to or formed integrally with the mounting means and extends distally to the ball receiving means. The configuration of the outside of the ball receiving means is of no great consequence, but the interior cavity must be generally in the configuration of a truncated sphere. Openings through the body into the cavity may, of course, be provided without departing from the invention. For example, a lubrication or examination port may be formed through the body into the cavity.

As described, the bottom of the ball receiving means, when the hitch is in use, is truncated or otherwise configured to define an opening 38 which extends from outside the body into the spherical cavity inside the body for permitting the shaft 14 to extend to the ball 12 when, in use, the ball is inside the spherical cavity. The exterior diameter of the ball 12 is slightly smaller, e.g. 0.010 to 0.3 cm, or more, than the inside diameter of the spherical cavity to permit the ball to rotate and pivot in the cavity without binding and at low friction. As will be apparent from the description below, and from the drawings, the cavity 36 is generally spherical, and is so described, departing from a pure spherical configuration by reason of the opening 38 to be described, and the opening 40 which is part of the ball insertion-removal means and is described below. The precise relationship of these diameters is not critical; however, the minimum clearance between the ball and the cavity which permits free rotation and pivoting is desired to minimize vibration of the ball in the cavity. The diameter of the ball and the cavity will, generally, be from about 4 cm to about 10 cm, but there is no criticality as to any particular dimension. Standard ball sizes currently in use for trailer hitches are quite suitable.

The opening 38 which, in use, opens downwardly, is preferably generally circular or elliptical, though the precise shape is not critical, and is formed in the body in intersecting relationship with another opening, that is part of the ball securing means described below to permit insertion and removal of the ball. The opening 38 is of a diameter intermediate the diameter of the ball 12 and the shaft 14 so as to permit free ball-joint motion of the ball 12 in cavity 36 but is smaller than the diameter of the ball and, thus, prevent removal of the ball from the cavity except by the use of the ball securing means described below.

An insertion-removal opening 40 intersecting opening 38 is formed in the ball receiving portion 34 and in the cylindrical shaft portion 32. The insertion-removal opening comprises a portion of the ball securing means which permits insertion and removal of the ball from the cavity 36. Opening 40 is defined in the body forming an insertion cavity and an insertion passage into the cavity 36 to permit insertion of the ball 12 into the body and passage into the cavity 36. The intersection of the opening 40 to the cavity 36 is so configured and constructed as to permit the ball to be inserted into the opening 40 and then moved generally in the direction of the axis of the shaft 32, i.e. laterally when the hitch is in use, into the cavity 36, removal of the ball being permitted only when the ball is entirely in the opening 40 in its initial insertion position. It will also be apparent from the drawings that the opening 40 intersects the cavity 36 at the front side thereof, as the hitch is in use. The remainder of the cavity 36, except for the shaft receiving opening 38, is defined by a solid, preferably unitary, body having a spherical cavity machined or formed therein.

The cylindrical shaft 32 defines a cylindrical passage 42 axially therethrough. The shaft portion 32 also defines a cylindrical aperture 44 extending through the wall of the shaft portion 32 on a diameter of the cylindrical passage 42 and a passage 46—48. The body, on the same diameter as opening 44, defines a locking leg of an approximately "L" shaped opening 50 in the wall of the shaft portion 32. The remainder of the "L" shaped opening 50, i.e. other than the locking portion thereof, obviously does not lie on the same diameter as the passage 44. The passage 44 and the locking portion of the opening 50 are, preferably, diametrically transverse of the shaft 23 and cylindrical passage 42 therein. This precise orientation of passages, however, is not critical. The passage 46—48 extends through the wall of the cylindrical portion 42 intersecting, generally, transversely, the aperture 44. The "L" shaped opening 50 is formed generally in the diametrically opposite wall of the cylindrical portion 32 from the aperture 44.

Figure 6:
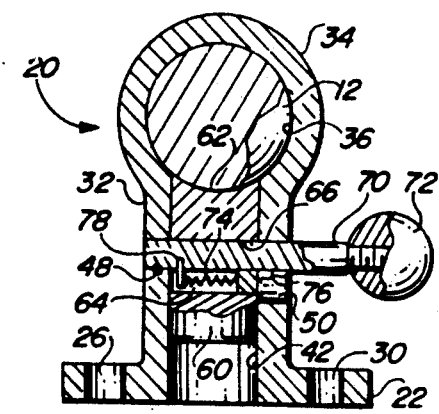
FIG. 6 is a cross-section looking downwardly from the top taken substantially on the diameter of the ball and the cylindrical passage formed in the body.

A locking plug 60 which is in the form of a right cylinder having the distal end 62 formed as a segment of a sphere having substantially the same diameter as that of the ball 12 and the cavity 36 is slidably received in the cylindrical passage 42 in shaft portion 32 for reciprocal motion from an open position, permitting the ball to be inserted into or removed from opening 40, to a closed position locking the ball in the cavity 36. In the locked position, as shown in FIG. 6, the distal end 62 of the plug 60 engages a portion of the ball 12 in the same manner as the ball is engaged in the cavity 36 to permit ball-joint rotary and pivotal movement of the ball in the cavity. The locking plug, however, prevents removal of the ball from the cavity.

The locking plug 60 is, in turn, retained into its locked position. The retainer for the locking plug comprises, formed in the locking plug, two intersecting cylindrical passages 64 and 66 extend that transversely of the locking plug preferably on a diameter thereof, a spring 74 and a keeper 76, the latter riding against the wall 42, received in the passage 64 and a handle shaft 70 extend extending through the passage 66. The handle shaft 70, in the preferred embodiment, has an indent formed therein adjacent the distal end thereof. A pin 78 extends from the handle shaft 70 and engages the end of the spring 74 distal of the keeper 76, thereby resiliently biasing the handle shaft 70, and a handle knob 72, toward the wall of the shaft 32 and, when in alignment, toward and into the passage 44 through the wall of the cylindrical portion 32. The passage 46—46 intersects the passage 44, as shown in FIG. 6. The insertion of a pin, such as a cotter pin 80, through the passage 46—48 and the indent in the handle shaft 70 prevents removal of the handle shaft 70 from the passage 44. The handle shaft 70 may, of course, have a passage formed therethrough to received the keeper pin 80, or may be engaged by or engage any suitable keeper structure. The L-shaped opening into the plug receiving passage, the shaft, plug and L-shaped opening are, in a preferred embodiment, so formed and configured as to define an over-center locking assembly.

In use, the keeper pin 80 is removed and, using the handle assembly 70–72, the cylinder is rotated slightly and moved reciprocally proximally toward the mounting means by moving the handle in the "L" shaped opening 50 in the cylindrical shaft portion 32. Movement of the plug proximally in the shaft 42 in the shaft portion 32 to the unlocked position removes the plug from the opening 40 thus permitting the ball 12 to be inserted into the opening 40 and the slide distally until it seats in the cavity 36. The locking plug 60 is then moved, by handle assembly 70-72, distally until the spherically concave end 62 thereof engages the ball. The locking shaft is then shifted into the locking position, shown in FIG. 6, where it is retained by the shoulder formed by the "L" shaped opening 50. The bias means, spring 74, keeper 76 and pin 78, urge the distal end of the handle shaft 70 into the passage 44, firmly locking the plug in place and, hence, locking the ball in the cavity. As a further assurance that the ball will not be released, the keeper pin 80 is inserted to prevent retraction of the handle shaft from the passage 44.

With an understanding of the invention, its advantages will be clearly apparent. Among these advantages are the following.

The ball is retained in the cavity by a solid metal flange formed by the intersection of the cavity with the truncated portion on the bottom of the ball receiving body. Thus, no amount of force which could be exerted in use in the vertical direction can cause the ball to be removed from the cavity.

Any force generated in use is not applied to the locking mechanism.

The ball is received in a substantially perfectly spherical cavity defined by the body and the end of the locking plug, permitting free movement and avoiding wear and binding which frequently occurs when only a portion of the ball is engaged.

The pulling force is applied evenly over nearly one-half of the surface of the ball, rather that isolated points, thus avoiding wear, galling of the ball, etc., and permitting more freedom of movement.

The ball is locked in the cavity by a multiple locking assembly which is free from virtually all of the stress of pulling or load carrying. The locking features include the absence of significant force acting on the plug during pulling and, thus, little or no tendency for the plug to move from its locking position. Securing the plug in its position by the handle shaft which is, in turn, secured at two points prevents accidental or inadvertent unlocking and precludes unlocking by any force which would be applied in use. The leg of the "L" shaped opening which forms the locking portion thereof extends downwardly when the hitch is in use, with the resulting tendency to stay locked. The opening 50 defines an over-center lock to prevent the movement of the locking shaft from one leg of the opening to the other leg of the "L" shaped opening. The keeper pin is totally free of all forces associated with the ball and cavity, rendering accidental unlocking of the hitch a virtually impossibility under any operating conditions.

The ball may be manufactured by any conventional method. Maximum strength and reliability is achieved by manufacturing the ball and shaft assembly from a single piece of forged steel, but such is not required. In like manner, the body in which the ball receiving cavity is formed is preferably manufactured as a single, unitary body by machining a single piece of forged steel. Either of these two major components may be manufacture as separate sub-components which are joined by welding or other means to form the final body.

Various retaining and keeper structures may be used to maintain the plug in the locked and/or unlocked position.

INDUSTRIAL APPLICATION

This invention is useful in the transportation industries generally and in the manufacture of trailers for industrial and individual use.

What is claimed is:

1. In a trailer hitch which comprises a ball having a shaft secured thereto for attachment to one vehicle and ball receiving means for attachment to the other vehicle for permitting one vehicle to pull the other, the improvement wherein the ball receiving means comprises:

a unitary elongate body having a proximal end portion, a distal end portion and an elongate generally cylindrical central portion, said portions respectively having a maximum transverse diameter, means at the proximal end for being attached to a vehicle, the distal portion defining a generally spherical ball receiving cavity which, when in use, forms a ball-joint with the ball, the central portion and the distal portion forming a bottom opening generally in the configuration of a keyhole defined by (i) a smaller generally circle-shaped opening from the center of the generally spherical ball receiving cavity to the bottom of the body and (ii) a larger generally circle-shaped opening in the proximal side of the generally spherical ball receiving cavity and the distal end of the central portion of the body, the larger and smaller circle-shaped openings intersecting and over-lapping each other to form said generally keyhole-shaped bottom opening, the smaller generally circle-shaped opening being so formed as to define a bottom opening for receiving the ball attachment shaft and being substantially larger than the ball attachment shaft and substantially smaller than the ball for permitting ball-joint motion of the ball in the cavity and preventing the ball from passing through the smaller generally circle-shaped opening, the larger generally circle-shaped opening being of a size and configuration for receiving the ball therein and intersecting the cavity in the distal end thereby forming a passage for the ball to move distally in the body from the ball receiving opening to the cavity the central portion of the body defining therein a generally concentric internal cylindrical passage;

a cylindrical plug slidably received in said passage in the body for selective reciprocal movement distally and proximally therein, the distal end of said plug defining a generally concave surface having a radius of curvature substantially equal to the radius of curvature of the ball to be used for engaging a side of the ball and locking the ball in the cavity; a shaft and means resiliently biasing an end of the shaft toward the body and wherein the body has formed therein an opening for being engaged by the shaft, the shaft having formed in the engaging end thereof an indent, and a keeper pin for being received in the passage and the indent in the keeper pin.

* * * * *